April 30, 1929. C. Z. EDELSON ET AL Re. 17,286

MATTRESS

Original Filed Feb. 4, 1924 2 Sheets-Sheet 1

Inventors
C. Z. Edelson, J. Goldeen,
M. D. Tarlow,
By H. H. Snelling
Their Attorney April 30, 1929. C. Z. EDELSON ET AL Re. 17,286

MATTRESS

Original Filed Feb. 4, 1924 2 Sheets-Sheet 2

Inventors
C. Z. Edelson,
J. Goldeen, M. D. Tarlow,
By H. H. Snelling
Their Attorney Reissued Apr. 30, 1929. Re. 17,286

UNITED STATES PATENT OFFICE.

CHARLES Z. EDELSON, JACOB GOLDEEN, AND MILTON D. TARLOW, OF PORTLAND, OREGON.

MATTRESS.

Original No. 1,559,686, dated November 3, 1925, Serial No. 690,654, filed February 4, 1924. Application for reissue filed October 17, 1927. Serial No. 226,779.

This invention relates to the art of mattress making.

An object of our invention is to provide an exceedingly simple and efficient mattress which will neither sag nor stretch.

A second object is to construct the mattress so that there will be a movement of air within the mattress whenever any of its portions are compressed or released.

A third object is the utilization of air within the mattress as an insulating medium which will make this mattress warm in cold weather and cool in warm weather, owing to the fact that the air filler can absorb and retain only a small amount of heat.

A fourth object is the utilization of springs having initial tension which are confined within each "biscuit" of the mattress between a pair of convex covers, which covers are also the spacing means.

A fifth object is the centering of the springs in the various biscuits, and to make it possible to employ roll edge and tufting machines now in common use in the art.

A sixth object is to so construct our mattress that every part of same will be employed in lending resiliency thereto.

A seventh object is to combine the spring elements with the means for limiting the expansion of the springs.

In addition to these objects we have endeavored to maintain the utmost flexibility and resiliency in the mattress, and at the same time to make the same reversible.

We accomplish these results in the manner set forth in the following specification and illustrated in the accompanying drawings, in which:

Figure 1 is a plan of the mattress of which

Figure 1:
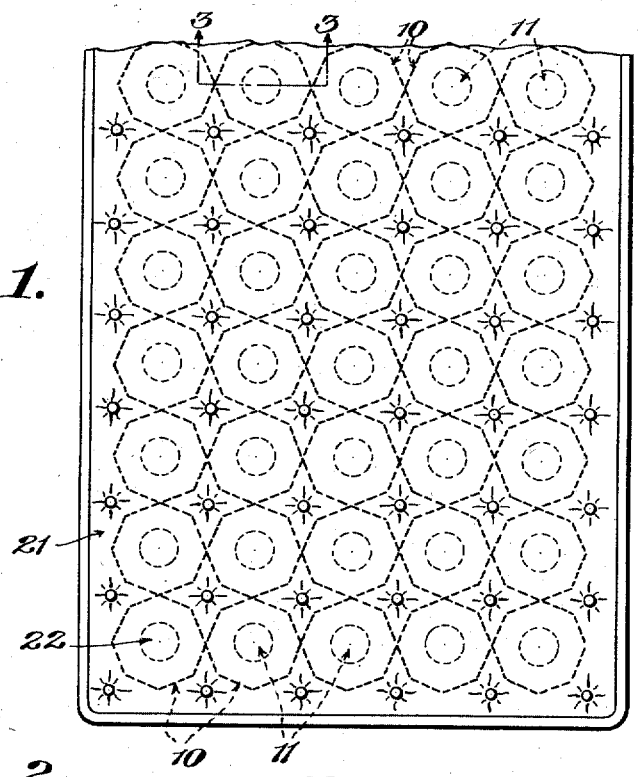
Figure 2:
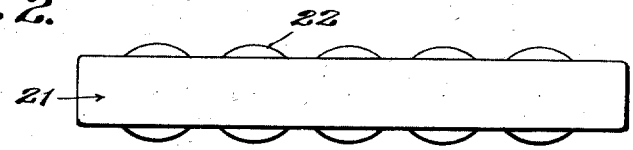
Figure 2 is an end elevation.
Figure 3:
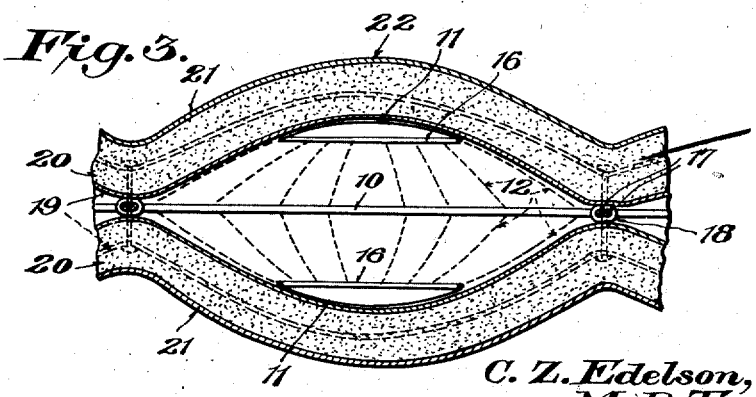
Figure 3 is a section along the line 3—3 in Figure 1.
Figure 4:
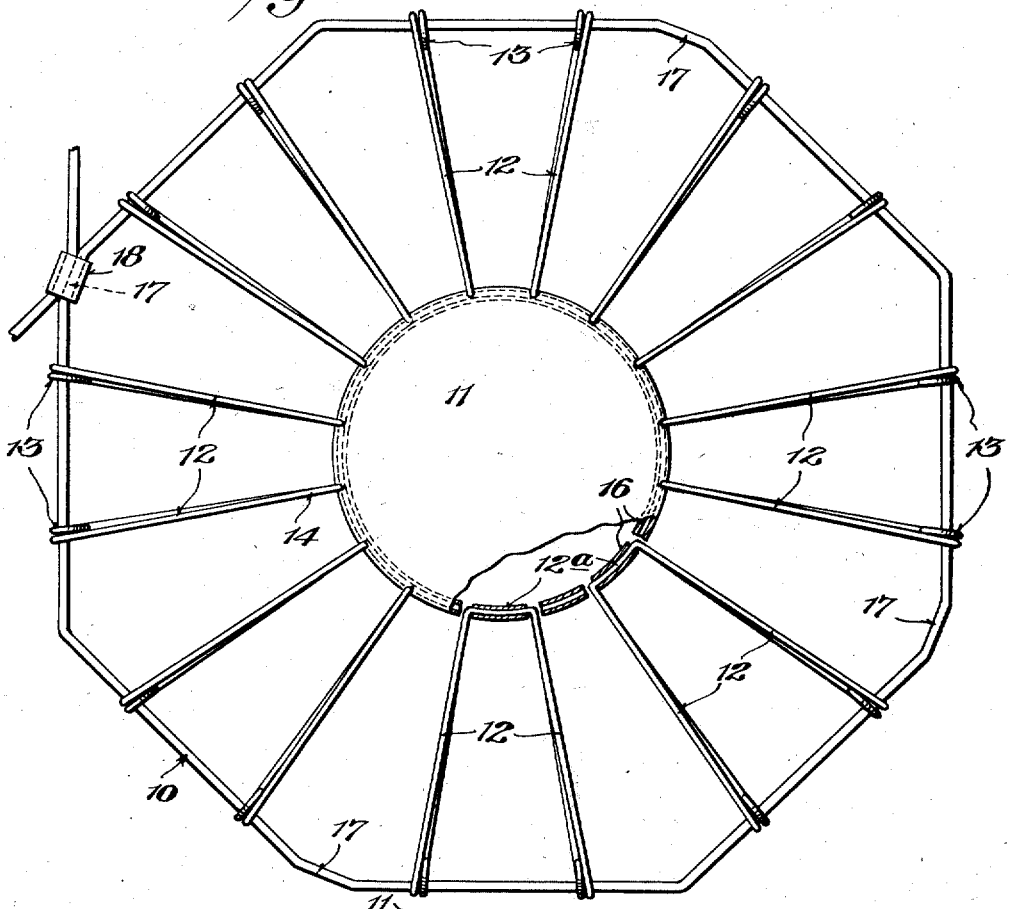
Figure 4 is a plan of one unit assembled.
Figure 5:
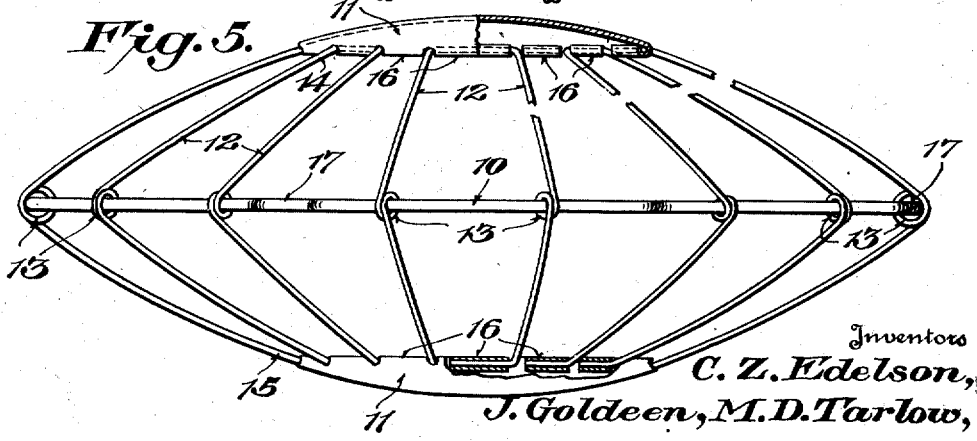
Figure 5 is a front elevation of the unit.

We have shown our invention in the drawings in its preferred form in which the means for limiting the expansion of the spring is a closed horizontal ring 10 which is preferably octagonal in shape and lies in a plane midway between the planes of the rims of the opposed anchors 11 here shown as convex covers of sheet metal. The bow springs each consist of two springs 12 having an integral mid-section 12ª whereby the two integral springs 12 are pivoted in the curled edge 16 of the upper anchor or cover 11. Each single spring is provided with a central coil 13 very loosely surrounding the ring 10, which, as shown in Figure 5, engages the outward turn of each coil preventing the springs from expanding beyond the position shown.

Of course it can readily be seen that with this construction of the spring one end of each spring will be closed as at 12ª and the other end of each spring will be open. On the closed end each spring pair hinges to alternate parts of the curled edge 16 of the upper cover, the cover or anchor being radially slotted to facilitate the forming of these curled edges, and at the two free ends of each spring pair the end of each spring is turned in the same direction, clockwise, for example, as viewed from above, to facilitate the assembling of the spring pairs in the bottom cover, the hinging being exactly the same as with the top anchor save that each curled edge is pivotally employed instead of every alternate one as in the case of the top cover.

It will be observed that the union between the springs 12 and the covers 11 is not rigid but hinged, which construction permits a great variety of movements of the cover 11 without injury to same, and also permits the springs themselves to support their portion of the load along their lengths instead of transferring the load to the covers 11 themselves. The springs with the two covers form an object which is an ellipsoid, that is, the springs define the margin of a surface of revolution generated by an ellipse both foci of which lie in the plane of the ring with the ring beyond the foci at each side and with the minor axis of the ellipse coinciding with the axis of the ring. The major axis of the cross section ellipse therefore lies in the plane of the ring. The ellipsoidal air chamber thus formed is totally unobstructed.

At each alternate corner of the ring 10 we have provided a flat face 17 which faces are joined by coupling rings 18 to a similar bend on adjacent rings 10. The two coils 13 of each integral pair of springs embrace a single one of the octagonal sides of the ring 10 and in this way the ring positions the springs insuring that the coils will return to correct position this being particularly true since the space between the coils of a pair of springs is less than the distance between coils 13 of adjacent unpaired springs. Expressing the same matter somewhat differently the junction point or corners of the ring serve to prevent a spring from working into the wrong section of the ring, making it unnecessary to indent the ring to position the springs.

In the usual size of mattress forty such units are employed, as shown, but this, of course, can be varied to suit the taste, the all-important point being the unitary construction by which each biscuit is enabled to operate independently of all of the rest, thereby preventing the stretching and sagging which is common in most mattresses.

When as many units of the device have been assembled as there are to be biscuits in the completed mattress, the assembled device is covered with light cloth 19 and one or more layers of the desired filler 20, after which it is placed in the ticking 21 and tufted and roll edged as is the common practice.

In some cases it may be found desirable to employ more filler on one side of the mattress than on the other or to increase the number of turns of the spring coils 13 on the octagonal ring, or to employ more than the eight spring pairs shown in each biscuit.

These and other minor changes, such as the style of coupling ring 18, the shape of the ring 10, etc. may be varied without departing from the spirit of our invention.

A mattress constructed as above described is free to be rolled in either direction or bent in any form without danger of injuring the mattress.

Owing to the fact that initial tension is supplied to the springs 12 it follows that any slight weakening of a spring, due to constant use, will still leave sufficient strength to bring the cover 11, and of course the biscuit 22, up to the proper position. Since any of the biscuits can be depressed independently of any of the other biscuits and will return to its original position it follows that it is a physical impossibility for the mattress to stretch or sag.

The size of the coil 13 is sufficient to permit its lateral movement on the ring 10. In its normal position it limits the separation of the anchors 11 and in its outward position it transfers the thrusts from the springs 12 to the sides of the octagonal ring, which itself acts as a spring offering a yielding resistance to complete depression of the cap 11.

We are aware that mattresses of various kinds have long been constructed, we therefore do not claim our device broadly but have directed our claims toward a mattress in which the individual biscuits are separately supported.

We claim:

1. In a spring device, a series of similar bowed springs, an anchor secured to one end of each spring, a second anchor secured to the other or free end of each spring, whereby as the bowed springs open or expand the anchors are moved apart, and a single means positioned outside of the space between the two anchors for limiting the expansion of the springs, while offering no resistance to the approach of the two anchors as the spring flex under load, said means being substantially non-extensible in length.

2. In a spring device, a series of similar bowed springs, an anchor secured to one end of each spring, a second anchor secured to the other or free end of each spring, whereby as the bowed springs open or expand the anchors are moved apart, and a single non-extensible means for limiting the expansion of the springs, while offering no resistance to the approach of the two anchors as the spring flex under load, said springs being hinged to one anchor and extending radially therefrom.

3. In a spring device, a pair of anchors, a plurality of radially disposed bowed springs secured to both anchors to flex when the anchors are caused to move together under load and to expand to separate the anchors when the load is removed, a central coil in each spring, and means passing loosely thru said coils to limit the separation of the anchors by restraining the expansion of the springs, while offering no resistance to the approach of the two anchors as the springs flex under load.

4. The device of claim 3 in which the anchors are each disk shaped, and each spring is hinged to both anchors.

5. The device of claim 3 in which the springs are each hinged to both anchors and the "means" is a closed ring midway between the two disk shaped anchors.

6. In a spring device, a plurality of opposed covers each slotted radially at its periphery to form inturned rolls, a plurality of pairs of bowed spring wires each pair pivoted at its middle in one of the inturned rolls of one cover and pivoted at its two free ends to adjacent rolls of the opposite cover, each member of each spring pair being formed with a vertex coil whereby the middle and the ends of each bow spring and consequently the two covers are urged apart, and a closed ring passing thru the several coils to position the spring device and to limit separation of the two covers, said ring being of such diameter that each bow spring member is held compressed when the two covers are at their limit of separation, said coils being of sufficiently large diameter to offer no obstruction to the close approach of the two covers.

7. A spring unit for mattresses consisting of a yielding octagonal ring; a cover placed on each side of said ring; bow spring means loosely and flexibly joining said covers to said ring and being limited in expansion by said ring the looseness in said joints being such as to transfer the thrust on said spring means to said ring after a definite movement of the covers together.

8. A spring unit for mattresses consisting of a yielding octagonal ring; a cover placed on each side of said ring; springs between said covers adapted to force same apart and to be limited in outward expansion by said covers, said springs being placed around the periphery of said ring, by threading said ring thru large central coils in said springs, adapted to provide clearance between said rings and the spring coils.

9. In a mattress, the combination of an octagonal ring; a pair of convex covers placed above and below the center of said ring; a plurality of bow springs loosely hinged on said ring with freedom for radial movement of the hinges and having their ends hinged to said covers.

10. The combination of a wielding octagonal ring; a pair of convex covers placed above and below the center of said ring; a plurality of bow springs loosely hinged on said ring around said covers and having their ends hinged to said covers, a filler over said cover and springs; a tick around said filler having tufts passing through said tick and filler outside of said ring.

11. In a mattress, the combination of a plurality of joined octagonal rings placed in rows at right angles to each other, each of said rings having placed above and below its center a pair of opposed convex covers; a double bow spring loosely hinged on each side of each octagonal ring; said springs urging said covers outwardly; a cloth cover over all of said convex covers and springs; a filler outside of said cloth cover; and a tick outside of said filler tufted between said units.

12. In a spring unit for assembly with a number of similar units within the filling of a mattress, a closed ring of resilient wire substantially non-extensible in peripheral length, and a plurality of springs of wire of smaller diameter loosely associated with the ring, and means for securing the springs together at each side of the ring so that the springs define an unobstructed air chamber elliptical in central cross section on any plane thru the axis of the ring, said ring in any such cross section lying outside of the two foci of the ellipse on both sides and alined therewith, 13. In a spring unit for assembly with rows and files of similar units as the middle layer of a mattress, a closed ring substantially non-extensible in peripheral length, a plurality of springs each having a coil loosely receiving the rings, means for securing the springs together so that they form an unobstructed air chamber the margin of which is a surface of revolution and any cross section of which thru the axis of revolution is substantially elliptical, said ring lying in the plane of revolution of the major axis of the ellipse with its axis coinciding with the axis of revolution, said ring limiting the length of the minor axis of the cross section ellipse by engagement with the springs, the relative strength of the parts being such as to require a light force to deform the unit when applied axially and to require a heavy force to deform the unit at right angles to the axis.

14. In a spring unit for aassembly with rows and files of similar units as the middle layer of a mattress, a closed octagonal ring of relatively heavy wire substantially non-extensible in peripheral length, a plurality of springs of relatively light wire and loosely coiled about the ring, means for securing the springs together so that they form an unobstructed air chamber the margin of which is a surface of revolution and any cross section of which thru the axis of revolution is substantially elliptical, and said ring lying in the same plane of revolution of the major axis of the ellipse with its axis coinciding with the axis of revolution, said ring limiting the length of the minor axis of the cross section ellipse by engagement with the springs, the relative strength of the parts being such as to require a light force to deform the unit when applied axially and to require a heavy force to deform the unit at right angles to the axis.

15. A spring unit for mattresses consisting of a yielding octagonal ring; a cover placed on each side of said ring; bow spring means adapted to loosely and flexibly join said cover to said ring and to be limited in its expansion by said cover in a manner that the looseness in said joints shall permit the thrust on said spring to be transferred to said ring.

16. In a mattress spring unit, a pair of anchors and a plurality of spring wires hingedly connected to both anchors, each one of the wires at one end being bent at a right angle to form a hinge and all the hinge ends engaging one anchor extending in the same direction.

17. A spring consisting of a wire having a short mid-section to form a hinge, two substantially parallel side sections at right angles to the hinge section, and two short end sections to form hinges, the end sections extending at right angles to the side sections.

18. In combination, a pair of disk-like anchors each radially slotted and inturned between the slots to form curled edges, a plurality of spring wires each with a mid-section received loosely within alternate curled edges of one cover, the two extensions from the mid-section being bent into bow springs, both ends being bent sharply and being loosely received within adjacent curled edges of the other anchor.

19. A spring element consisting of a length of spring wire having a short mid-section to form a hinge, integral extensions at right angles to the hinge and bowed to the shape of a half ellipse, the hinge and the two ends positioned at the ends of the minor diameter, each of the bowed extensions having a coil at the end of the major diameter to receive very loosely a restraining element, said spring ends being bent laterally to provide hinges.

CHARLES Z. EDELSON.
JACOB GOLDEEN.
MILTON D. TARLOW.